S. Hamblin,
Bait Mill.
No. 101,260. Patented Mar. 29, 1870.

Witnesses.
A. L. Dunbar
L. T. Talbot

Silvanus Hamblin, Inventor.

United States Patent Office.

SILVANUS HAMBLIN, OF TAUNTON, MASSACHUSETTS.

Letters Patent No. 101,260, dated March 29, 1870.

IMPROVED BAIT MILL FOR FISHERMEN.

The Schedule referred to in these Letters Patent and making part of the same

*To all whom it may concern:*

Figure 1:
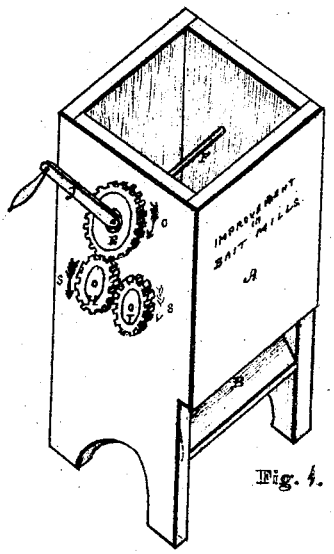
Figure 2:
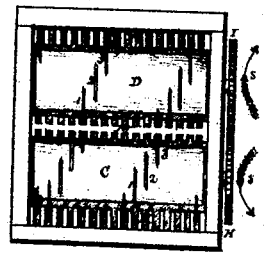
Figure 3:

Be it known that I, SILVANUS HAMBLIN, of Taunton, in the county of Bristol and State of Massachusetts, have invented certain new and useful improvements in machines for grinding bait for fishermen's use, termed Bait Mills; and I do hereby declare that the following is a full, clear, and exact description thereof, reference being had to the accompanying drawings making a part of this specification, in which Figure 1 is a perspective view of the mill;

Figure 2 a bird's-eye view, with the toothed-wheel E, and the shaft F removed; and Figure 3 a cross-section of one of the heads, showing the peculiar form of the knives.

A is a box or casing, made of wood, and having a mouth or discharging-orifice at B;

C and D heads or rolls to which the knives 1, 2, 3 are attached;

E the driving-wheel with its shaft F, and which receives its motion by means of the crank J;

H and I are toothed or gear-wheels attached to the end of the shafts of the heads C and D;

K K are bars between which the knives pass. These bars are stationary, and are secured to the inside of the casing A, abreast of each head.

M is a separating piece between the heads, and serrated to admit the passage of the knives.

The gear-wheel I meshes into the wheel H, and that into the driving-wheel E. Thus it will be seen that when the wheel E is turned by means of the crank J, in the direction of the arrow O, the wheels H and I (and with them the heads C and D) revolve in the direction of the arrows S S.

Menhaden or other fish to be used as bait, are thrown into the open top of the mill, and such fish, by the motion of the heads, are brought over until they strike against the bars K K. The bait is prevented from passing down by these bars until the knives have cut it into pieces, corresponding in length with the distance that the knives are apart. The knives are made of plate steel, in the form of a segment of a circle, as shown in fig. 3, and are secured in the heads C and D either by being cast therein, when the heads are made of iron, or attached by screws when the heads are made of wood.

In mills for this purpose heretofore used, gear-wheels have never been employed, one head only being used to which the crank was attached, and the knives have been simply straight blades projecting from the head, and passing between a set of stationary knives of the same style. The result was that soon the knives became dulled, and they were crowded through, dragging the bait after them, not cutting but tearing it into pieces, and to obtain these pieces sufficiently small for use the whole had to be re-ground. The advantages which I have found to result from the use of my improvement are the complete cutting up or dividing of the bait by passing once through the machine, and the ease and speed with which it is accomplished. By the peculiar form of the knives they pass through the bait with a drawing cut, not by a direct pressure.

What I claim as my improvement and invention, and desire to secure by Letters Patent, is—

The heads C and D provided with the knives 1, 2, 3, and operated by the gear-wheels E, H and I, in combination with the bars K, and serrated separating piece M, all constructed and arranged to operate as herein described for the purpose specified.

SILVANUS HAMBLIN.

Witnesses:
ARTHUR H. SPROAT,
JAMES R. MATHEWSON.